(12) United States Patent
Ravichandran et al.

(10) Patent No.: US 11,242,262 B2
(45) Date of Patent: Feb. 8, 2022

(54) SELF-PROPAGATING LOW-TEMPERATURE SYNTHESIS AND PRE-TREATMENT OF CHALCOGENIDES FOR SPARK PLASMA SINTERING

(71) Applicant: Texas Biochemicals Inc., College Station, TX (US)

(72) Inventors: Duraiswamy Ravichandran, College Station, TX (US); V S Reddy Channu, College Station, TX (US)

(73) Assignee: TEXAS BIOCHEMICALS INC.

( * ) Notice: Subject to any disclaimer, the term of this patent is extended or adjusted under 35 U.S.C. 154(b) by 0 days.

(21) Appl. No.: 15/390,853

(22) Filed: Dec. 27, 2016

(65) Prior Publication Data
US 2018/0290896 A1    Oct. 11, 2018

Related U.S. Application Data

(63) Continuation-in-part of application No. 13/371,187, filed on Feb. 11, 2011, now Pat. No. 9,575,219.

(51) Int. Cl.
*C01B 19/00* (2006.01)
*B29B 11/00* (2006.01)
(Continued)

(52) U.S. Cl.
CPC .............. *C01G 11/02* (2013.01); *B28B 3/003* (2013.01); *B28B 11/243* (2013.01);
(Continued)

(58) Field of Classification Search
CPC ......... C01G 9/08; C01G 11/02; C01B 19/007; C01P 2002/72; C01P 2002/82;
(Continued)

(56) References Cited

U.S. PATENT DOCUMENTS 5,126,081 A    6/1992  Willingham
5,281,465 A    1/1994  Wahl
(Continued)

OTHER PUBLICATIONS

C. Chlique, G. Delaizir, O. Merdrignac-Conanec, C. Roucau b, M. Dollé, P. Rozier, V. Bouquet, X.H. Zhang, A comparative study of ZnS powders sintering by Hot Uniaxial Pressing (HUP) and Spark Plasma Sintering (SPS), Optical Materials 33 (2011) 706-712. (Year: 2011).*

(Continued)

*Primary Examiner* — Bijan Ahvazi

(57) ABSTRACT

A method is provided for producing an article which is transparent to IR wavelength in the region of 4 μm to 9 μm. The method includes the steps of (a) Producing ultra-fine powders of ZnS, (b) followed by pretreatment of the ultra-fine powders under reduced gas conditions including H2, H2S, N2, Ar and mixtures there of (c) followed by vacuum ($3\times10^{-6}$ torr) treatment to remove oxygen and sulfates adsorbed to the surface disposing a plurality of nano-particles on a substrate, wherein said nanoparticles comprise ZnS with ultra-high purity of cubic phase; (b) subjecting the nano-particles to spark plasma sintering thereby producing a sintered ZnS product with IR transmission reaching 75% in the wavelength range of 4 μm to 9 μm.

11 Claims, 6 Drawing Sheets

(51) Int. Cl.
*G02B 1/00* (2006.01)
*C01G 11/02* (2006.01)
*C01G 9/08* (2006.01)
*B28B 3/00* (2006.01)
*B28B 11/24* (2006.01)

(52) U.S. Cl.
CPC .............. *C01B 19/007* (2013.01); *C01G 9/08* (2013.01); *C01P 2002/72* (2013.01); *C01P 2002/82* (2013.01); *C01P 2004/03* (2013.01); *C01P 2004/61* (2013.01); *C01P 2004/64* (2013.01); *C01P 2006/60* (2013.01); *C01P 2006/90* (2013.01)

(58) Field of Classification Search
CPC .............. C01P 2004/03; C01P 2004/64; C01P 2006/60; C01P 2006/90; B28B 3/003; B28B 11/243
See application file for complete search history.

(56) References Cited

U.S. PATENT DOCUMENTS

| | | |
|---|---|---|
| 5,324,353 A | 6/1994 | Wahl |
| 5,575,959 A | 11/1996 | Harris |
| 6,111,689 A | 8/2000 | Shibata |
| 7,790,072 B2 | 9/2010 | Korenstein |
| 8,426,817 B2 | 4/2013 | Ravichandran |
| 8,803,088 B1 | 8/2014 | Ravichandran et al. |
| 2012/0205540 A1 | 8/2012 | Ravichandran |

OTHER PUBLICATIONS

Harris, Daniel, C., "Development of Hot-Pressed and Chemical-Vapor-Deposited Zinc Sulfide and Zinc Selenide in United States for Optical Windows", (2007), Proceedings of SPIE, XP00215445, vol. 6545, No. 1, pp. 654502-1-654502-27, USA.

J. A. Savage, Infrared Optical Materials and Their Antireflection Coatings, Adam Hilger Ltd., Bristol and Boston (1985), pp. 95-111, USA.

Z. Shizen, M. A. Hongli, R. Jean, M.C. Odile, A. Jean-Luc, L. Jacques, Z. Xianghua Optoelectronics and Advanced Materials, vol. 1, No. 12, Dec. 2007, p. 667-671,Romania.

Y.D. Kim, K. Sonezaki, H. Maeda, A.Kato, Journal of Materials Science, Oct. 1997, vol. 32, Issue 19, pp. 5101-5106, UK.

D. Ravichandran and V.S. Reddy Channu, ZnS—Ga composite sensor windows with increased hardness for LWIR applications . . . . 15th Electro-Magnetic Dept. of Defense Window Symposium, Presented at the Office of Naval Research, May 17-19, 2016, Arlinton—VA, USA.

J.J. Kingsley, K.C. Patil, Mater. Lett. 6 (11,12) (1988) 427-432., USA.

J.J. Kingsley, K. Suresh K.C. Patil, J. Mater. Sci. 25 (1990) 1305-1312, UK.

J.J., Kingsley, S. Sundar Manoharan, K. Suresh, K.C. Patil, Proceedings of the 2nd International Conference on Ceramic Powder Processing Science, Oct. 12-14 Berchtesgaden, 1988, pp. 343-349, Bavaria, Germany.

J.J. Kingsley, L.A. Chick, G.W. Coffey, D.E. McCready, L.R. Pederson, Mat. Res. Soc. Symp 271 (1992) 113-120, USA.

L.A. Chick, L.R. Pederson, G.D. Maupin, J.L. Bates, L.E. Thomas, G.J. Exarhos, Mater. Lett. 10 (1,2) (1990) 6-12, USA.

J.J. Kingsley, L.R. Pederson, Mater. Lett. 18 (1993) 89-96, USA.

J.J. Kingsley, L.R. Pederson, Mat. Res. Soc. Symp. Proc. 296 (1993) 361-366, USA.

L.R. Pederson, G.D. Maupin, W.J. Weber, D.J. McCready, R.W. Stephens, Mater. Lett. 10 (9) (1991) 437-443, USA.

* cited by examiner

SELF-PROPAGATING LOW-TEMPERATURE SYNTHESIS AND PRE-TREATMENT OF CHALCOGENIDES FOR SPARK PLASMA SINTERING

BENEFIT OF PRIOR APPLICATION—CONTINUATION IN PART

Application Ser. No. 13/371,187, which is continuation of Application No. 61/463,039 filed on Feb. 11, 2011
Filing date: Feb. 11, 2011
Publication # US-20120205540.
Continuation of application Ser. No. 13/407,223 now U.S. Pat. No. 8,426,817; continuation of application Ser. No. 13/904,786 now U.S. Pat. No. 880,388

STATEMENT REGARDING FEDERALLY SPONSORED RESEARCH OR DEVELOPMENT

Yes. Funded by the U.S. Army Materials Research and Development Engineering Command, Red Stone Arsenal, AL-35898, under Contract # W31P4Q-12-C-0064.

CROSS REFERENCE TO RELATED APPLICATION

1. US Published Application #-20120205540-Filed on Feb. 11, 2011
2. U.S. Pat. No. 8,426,817, D. Ravichandran and B. Devan.
3. U.S. Pat. No. 880,388, D. Ravichandran and Yitong Shi.
4. U.S. Pat. No. 5,281,465, J. Wahl et. al
5. U.S. Pat. No. 5,575,959, Harris et. al
6. U.S. Pat. No. 5,281,465, J. Wahl et. al
7. U.S. Pat. No. 5,324,353, J. Wahl et. al
8. U.S. Pat. No. 7,790,072, R. Korenstein et. al
9. U.S. Pat. No. 6,111,689, K. Shibata
10. U.S. Pat. No. 5,126,081, C. B. Willingham, J. Pappis
11. U.S. Pat. No. 5,575,959, N. H. Harris, T. K. Dougherty

OTHER PUBLICATIONS

1. Harris, Daniel C., "Development of Hot-Pressed and Chemical-Vapor-Deposited Zinc Sulfide and Zinc Selenide in the United States for Optical Windows", (2007), Proceedings of SPIE, XP002515445, vol. 6545, No. 1, pp. 654502-1-654502-27.
2. J. A. Savage, Infrared Optical Materials and Their Antireflection Coatings, Adam Hilger Ltd., Bristol and Boston (1985), pp. 95-111.
3. Z. Shizen, M. A. Hongli, R. Jean, M. C. Odile, A. Jean-Luc, L. Jacques, Z. Xianghua, OPTOELECTRONICS AND ADVANCED MATERIALS, Vol. 1, No. 12, December 2007, p. 667-671.
4. Y. D. Kim, K. Sonezaki, H. Maeda, A. Kato, Journal of Materials Science, 10-1997, Volume 32, Issue 19, pp 5101-5106.
5. D. Ravichandran and V. S. Reddy Channu, ZnS—Ga composite sensor windows with increased hardness for LWIR applications, 15th Electro-Magnetic Dept. of Defense Window Symposium, Presented at the Office of Naval Research, May 17-19, 2016. Arlington, Va.
6. J. J. Kingsley, K. C. Patil, Mater. Lett. 6 (11,12) (1988) 427-432.
7. J. J. Kingsley, K. Suresh, K. C. Patil, J. Mater. Sci. 25 (1990) 1305-1312.
8. J. J., Kingsley, S. Sundar Manoharan, K. Suresh, K. C. Patil, Proceedings of the 2nd International Conference on Ceramic Powder Processing Science, October 12-14 Berchtesgaden, Bavaria, FRG., 1988, pp. 343-349.
9. J. J. Kingsley, L. A. Chick, G. W. Coffey, D. E. McCready, L. R. Pederson Mat. Res. Soc. Symp. 271 (1992) 113-120.
10. L. A. Chick, L. R. Pederson, G. D. Maupin, J. L. Bates, L. E. Thomas, G. J. Exarhos, Mater. Lett. 10 (1,2) (1990) 6-12.
11. J. J. Kingsley, L. R. Pederson, Mater. Lett. 18 (1993) 89-96.
12. J. J. Kingsley, L. R. Pederson, Mat. Res. Soc. Symp. Proc. 296 (1993) 361-366.
13. L. R. Pederson, G. D. Maupin, W. J. Weber, D. J. McCready, R. W. Stephens, Mater. Lett. 10 (9) (1991) 437-443.

REFERENCE TO SEQUENCE LISTING, A TABLE, OR A COMPUTER PROGRAM LISTING COMPACT DISK APPENDIX

Not Applicable

BACKGROUND OF THE INVENTION

Field of Invention

The invention relates generally to the production of infrared optical windows, and more specifically to the material and process for fabricating such windows. The materials include Chalcogenide such as ZnS, CdS, ZnSe. Fine grain optical windows incorporate nanoscale materials that are synthesized, pre-treated and sintered for use in Long wavelength and multi-spectral domes and windows. This invention is continuation in part of the invention on "Ultra-High Densification of ZnS For Nano-Grain Optical Windows", with application Ser. No. 13/371,187 (US 20120205540) filed on Feb. 11, 2011 by inventors Ravichandran et. al Optical windows and domes employed in missile systems for infra-red imaging demand good mechanical stability and high optical transmission in the wavelength range between 0.4 micron and 12 microns. Zinc Sulfide (ZnS), Zinc Selenide (ZnSe), Germanium (Ge), Gallium Arsenide (GaAs), Gallium Phosphide (GaP), Mercury (Hg) and Cadmium Telluride (CdTe) are used in applications such as missile domes which require high transmission in the visible, mid IR and in the long infrared wavelength. Germanium is extremely expensive due to its low availability in nature. The fabrication of ZnS and ZnSe via Chemical Vapor Deposition (CVD) process is problematic due to use of toxic gases, and is not an environmentally benign process. Moreover, the cost of production is very high due to low yield and extended processing time.

ZnS is used as a window material for both long wave-infrared (LWIR) wavelength and multispectral ZnS is used as semi-active laser dome. The wavelength of interest is 4 micron to 9 micron. The ZnS for these applications is made by CVD process. ZnS is made commercially by low-pressure hot-wall chemical vapor deposition (CVD) from zinc vapor and hydrogen sulfide gas. Deposition of ZnS probably occurs by a combination of (1) homogeneous gas phase reactions where particles diffuse to the substrate and (2) heterogeneous reactions at the growth surface. The nature of these reactions determines the microstructure, growth rate, and optical quality. The main impurities in CVD ZnS are believed to be oxygen and hydrogen. The presence of porosity in some CVD ZnS is believed to be related to the adsorption of gas molecules on the growing solid surface and subsequent trapping of gas as material is deposited around them. CVD ZnS thus produced is yellowish and opaque in the visible, requiring additional post-processing for application to windows in the visible and near-infrared region. Additional heat treatment of CVD processed ZnS have been employed in an attempt to produce clear and colorless material from the visible through the long-wave infrared wavelengths. It is clear that the CVD process duration is too long running to several hours to days and the IR transmission obtained through this process between 4 micron and 9 microns does not exceed 70%. Further the yield is low. Hence the process is neither cost effective nor of high performance in terms of high IR transmission. In the prior art, an alternate process called 'spark plasma sintering' (SPS) has been employed to compress the time cycle involved in fabrication of ZnS for IR window application. Although SPS is a short duration process, running to several minutes instead of several hours, the IR transmission of ZnS, in the wavelength between 4 micron and 9 micron never reached beyond 60%.

Hence there exists a dire need in the industry to have material of IR windows that possess superior IR transmission, in the wavelength between 4 micron and 9 micron, coupled with cost-effective manufacturing. The present invention finds a solution to the long felt need of the industry by way of an innovative integrated process that comprises 'self-propagating low temperature synthesis' (SPLTS) of nano-particles, followed by pre-treatment of nano-particles and further followed by the final spark plasma sintering process. The nano-particles classified under Chalcogenides include nano-powders of ZnS (or CdS or ZnSe).

SUMMARY OF THE DISCLOSURE

An innovative process to make ZnS, CdS and ZnSe windows that are more erosion-resistant and possess ultra-high density can be visualized through the generation of ultra-fine powder via SPLTS followed by pre-treatment, prior to spark plasma sintering.

SPLTS involves an exothermic reaction between metal acetates, metal nitrates and a fuel at low temperature <500° C. SPLTS synthesis is an important powder processing technique generally used to produce complex oxide ceramics such as aluminates. The process involves the exothermic reaction of an oxidizer such as metal acetates, metal nitrates, ammonium nitrate, and ammonium perchlorate and an organic fuel, typically thiourea, ($CH_4N_2O$), Thioacetamide, carbohydrazide ($CH_6N_4O$), or glycine ($C2H_5NO_2$). The SPLTS reaction is initiated in a box furnace or on a hot plate at temperatures of 500° C. or less; much lower than the phase transition of the target material.

In a typical reaction, the precursor mixture of water, including metal acetates, metal nitrates, and fuel including thiourea, thioacetamides and glycerol decomposes, dehydrates, and ruptures into a flame after about 3-5 min. The resultant product is a voluminous, foamy powder which occupies the entire volume of the reaction vessel. The chemical energy released from the exothermic reaction between the metal acetates, metal nitrates and fuel can rapidly heat the system to without an external heat source. SPLTS synthesized powders are generally more homogeneous, have fewer impurities, and have higher surface areas than powders prepared by regular conventional solid-state methods.

CdS, ZnS and ZnSe nano-powders were produced via SPLTS using respective acetates, Nitrates including Cadmium acetates, Cadmium Nitrates, Zinc acetates and Zinc Nitrates. Sulfur sources including thiourea, thioacetamides and Selenium disulfides.

Prior to Spark plasma sintering method, the starting powder of nano-particles produced via SPLTS undergoes a pre-treatment procedure in a controlled gas ambient at temperature as per the following procedure: (i) The powder is placed in a quartz boat and the powder is continuously heated anywhere between 450-700° C. for 2 to 4 hr. under a mixed gas ambient of H2S (5-20% H2S)+H2 (95-80%), H2S (5-20% H2S)+N2 (95-80% N2 gas), H2S (5-20% H2S)+Ar (95-80%), Ar (100%) and N2 (100%). After that the furnace is cooled down to room temperature, the cooled zinc sulfide powder is placed in a globe box purged with Argon gas, then sieved through a 140 mesh sieve and stored in glass bottles in a humidity controlled chamber containing drierite with less than 1% RH (relative humidity). This nanopowder is further heated under vacuum ranging from ($1\times10^{-3}$ torr) to ($3\times10\sim10^{-6}$ Torr) between 450 and 600° C. for 3-6 hr. to remove any traces of oxygen and sulfates present in the powder. This is done to remove surface adsorbed oxygen and sulfates impurities that are deleterious to the transparency of the IR windows. The next process step commences with filling of thus pre-treated nano-particles in a specially passivated cavity of the conductive mold and placing the filled mold in a vacuum chamber similar to that used in the hot press method. The mold die-set materials include made from the alloy TZM (Titanium-Zirconium-Molybdenum) or Graphite. Preferably, the mold is made of special grade graphite. In all these cases, special care is taken to eliminate contamination of sintered material emanating from the material of the mold. Pressure is applied to the mold from the top and bottom using upper and lower energizing punch electrodes. At the same time, pulsed direct current is allowed to flow through the mold through the energizing punch electrodes. A power supply for generating pulsed direct current may be utilized which is similar to the power supply used for an electrical discharge machine. The pulsed direct current in transition mode may be applied at an initial stage of sintering and continuous pulsed direct current through train of pulses may be applied thereafter or, alternatively, a continuous train of pulsed direct current may be applied throughout the sintering.

In one aspect, a method is provided for producing an article which is transparent to infrared in the wavelength range of 4 micron to 9 micron. The method includes the steps of forming ultra-fine powders via SPLTS process, then treatment of ultra-fine powders under reducing gas conditions including $H_2$, $H_2S$, $N_2$, Ar gases and mixtures of $H_2S/H2$ with volume ratio 1:(4,9), H2S/N2 with volume ratio 1:(4,9) and H2S/Ar with volume ratio 1:(4,9) and followed by vacuum treatment to remove any surface contamination including oxygen and sulfates and other trace level impurities, a green body from a population of nano-particles followed by SPS sintering, thereby producing a sintered product.

DETAILED DESCRIPTION

Figure 1:
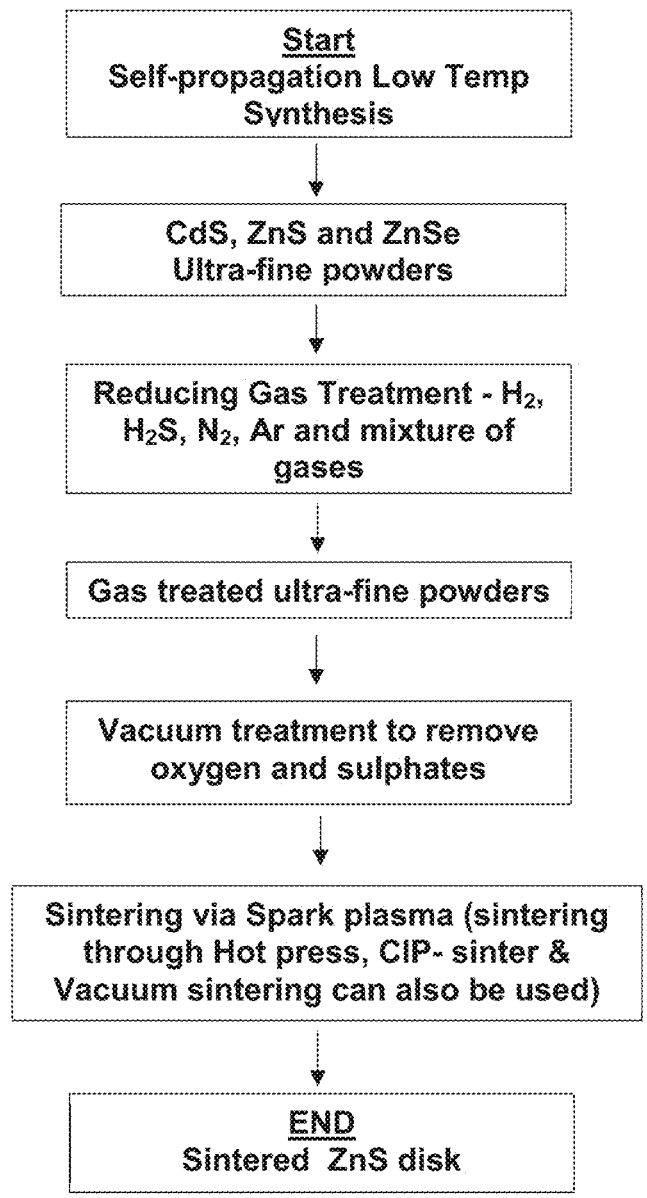
FIG. 1 is a flow chart depicting an embodiment of a method for producing sintered articles in accordance with the teachings herein.

FIG. 1 shows the process flow chart of the innovative integrated process of the current invention. The process commences with SPLTS. SPLTS involves an exothermic reaction between metal acetates, metal nitrates and a fuel at low temperature <500° C. SPLTS synthesis is an important powder processing technique generally used to produce complex oxide ceramics such as aluminates. The process involves the exothermic reaction of an oxidizer such as metal nitrates, metal acetates, ammonium nitrate, and ammonium perchlorate and an organic fuel, typically thiourea ($CH_4N_2O$), Thioacetamide, carbohydrazide ($CH_6N_4O$), or glycine ($C_2H_5NO_2$). The combustion reaction is initiated in a box furnace or on a hot plate at temperatures of 500° C. or less; much lower than the phase transition of the target material.

In a typical reaction, the precursor mixture of water, including metal acetates, metal nitrates, and fuel including glycerol, thiourea and thioacetamides decomposes, dehydrates, and ruptures into a flame after about 3-5 min. The resultant product is a voluminous, foamy powder which occupies the entire volume of the reaction vessel. The chemical energy released from the exothermic reaction between the metal nitrates and fuel can rapidly heat the system to without an external heat source. SPLTS synthesized powders are generally more homogeneous, have fewer impurities, and have higher surface areas than powders prepared by regular conventional solid-state methods.

Figure 2:
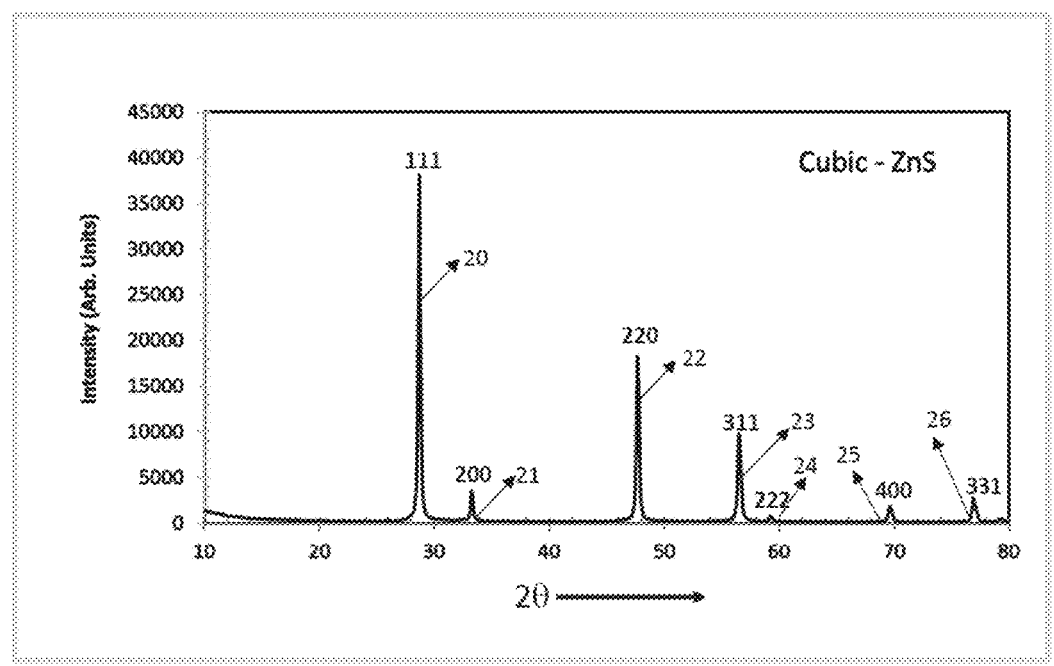
FIG. 2 is a powder X-ray diffraction of a zinc sulphide nano-powder sample made in accordance with a methodology disclosed herein.

CdS, ZnS and ZnSe nano-powders were produced via SPLTS using respective Nitrates including Cadmium Nitrates, Zinc Nitrates and acetates including cadmium acetates and Zinc acetates. Sulfur sources including thiourea, thioacetamides and Selenium disulfides. The current invention synthesizes ZnS through SPLTS. FIG. 2 shows the x-ray diffraction analysis of cubic crystalline phase of ZnS FIG. 2 shows a high resolution powder X-ray diffraction of ultra-high purity (99.99%) cubic zinc sulphide nano-powder. The diffraction peak 20 corresponds to the (1, 1, 1) plane of the cubic crystalline ZnS material, and similarly, the peak 21 corresponds to the (2, 0, 0) plane, the peak 22 corresponds to the (2, 2, 0) plane, the peak 23 corresponds to the (3,1,1) plane, the peak 24 corresponds to the (2,2,2) plane, the peak 25 corresponds to the (4,0,0) plane and peak 26 corresponds to the (3,3,1) plane of the cubic crystalline ZnS material. As can be seen from the FIG. 2, there are only cubic phases and these are the ones contributing to the increase in IR transmission in the finished product.

Figure 3:
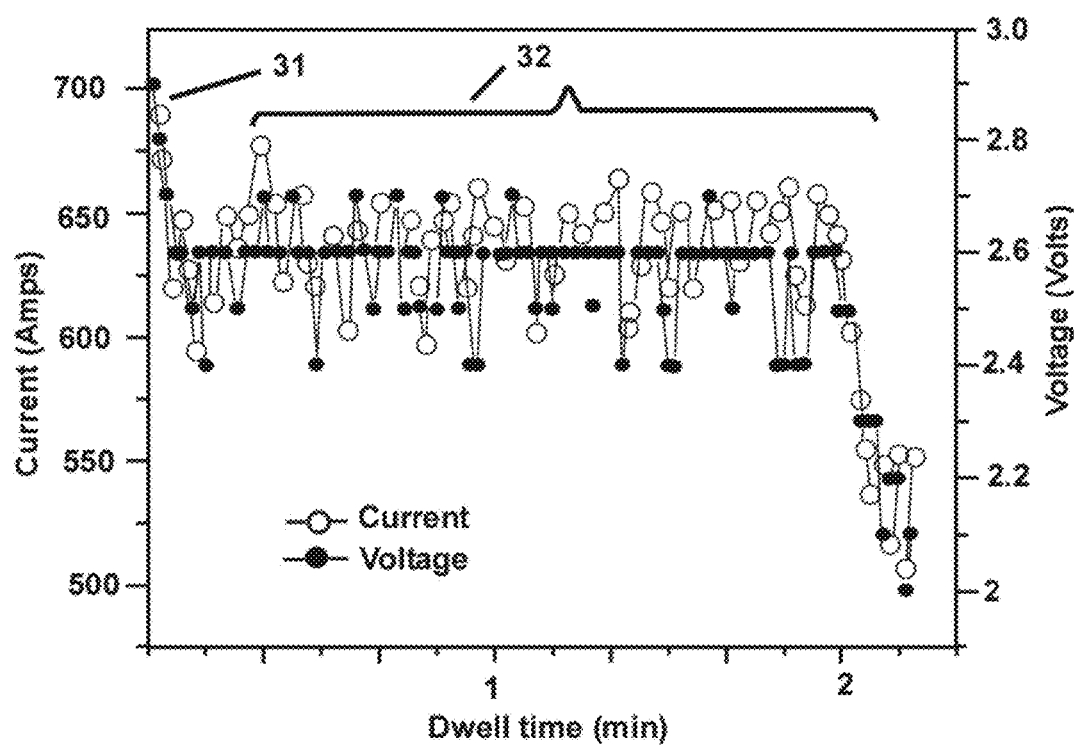
FIG. 3 is an illustration of voltage-current vs Time during spark plasma dwell time.

FIG. 3 shows the voltage-current vs time during the spark plasma dwell time of two minutes. During this dwell time the vacuum was held at 10 Pascal and the mold temperature was around 750°-820° C. with punch pressure around 100-120 MPa. It can be seen that the current initially starts with high 31 value of around 675 Amps and starts decreasing and fluctuating 32 around 630 Amps thus indicating the grain-welding process the evaporation of material and fusion of inter-grain region. The voltage plot shown is the variation of voltage across the electrodes (top and bottom punches) and the voltage is also fluctuating depending on the current. Note that the voltage plotted is not the supply voltage that is in the form of regularly shaped pulses.

The ZnS ceramic specimens are preferably polished in three different steps such as grinding, polishing, and fine polishing. Initial grinding removes any saw marks and cleans the specimen surface. This is accomplished manually on a dry 240 grit $Si_3N_4$ sand paper. The $Si_3N_4$ abrasive particles are bonded to the paper for fast stock removal. The polishing and fine polishing removes the artifacts of grinding. During polishing, a COTLAP™ Polish Cloth was used with 3 µm diamond powder. A mirror finish was achieved using a RAYON™ Velvet polish cloth with 1 µm diamond on it. In both polishing and fine polishing, the diamond abrasive particles were suspended in oil and thus were able to roll or slide across the cloth in order to obtain mirror polished sintered body.

The mirror polished ZnS polycrystalline ceramic materials were used to collect the percentage IR transmittance. Fourier transform infrared (FT-IR) spectra were recorded on a IS 50 Fourier transform infrared spectrometer.

Figure 4:
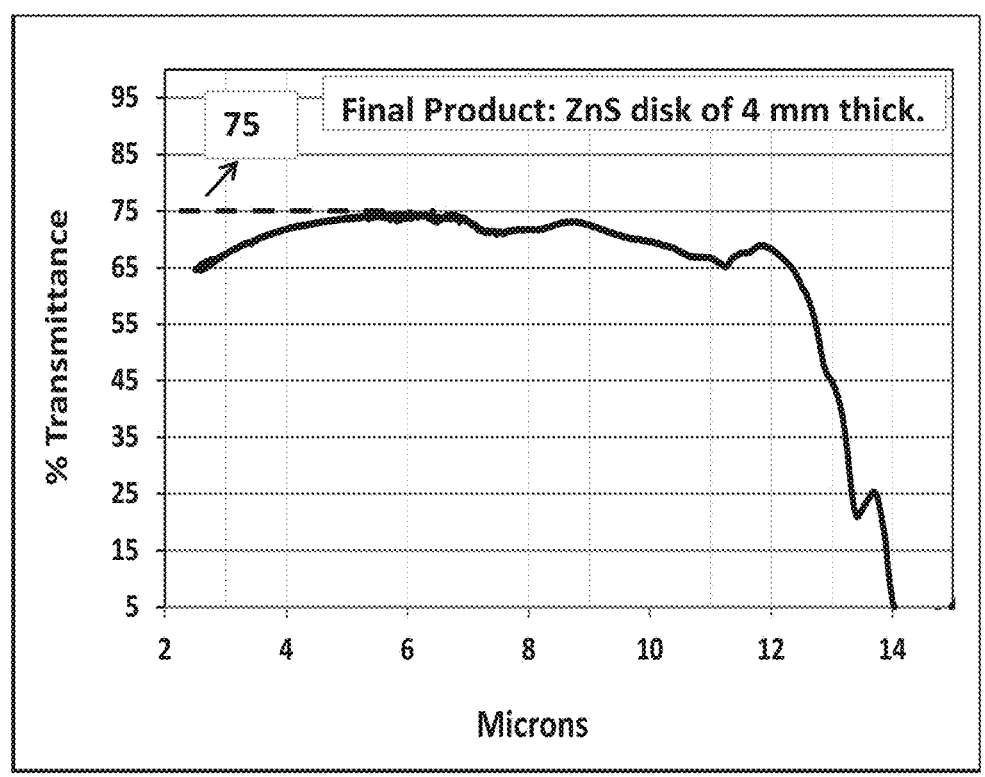
FIG. 4 is an FTIR spectrum of a ZnS article made in accordance with the teachings herein.

FIG. 4 shows the percentage of IR transmittance of the ZnS polycrystalline ceramic samples with 75% transmittance in the long wavelength region (5-9 microns).

Figure 5:
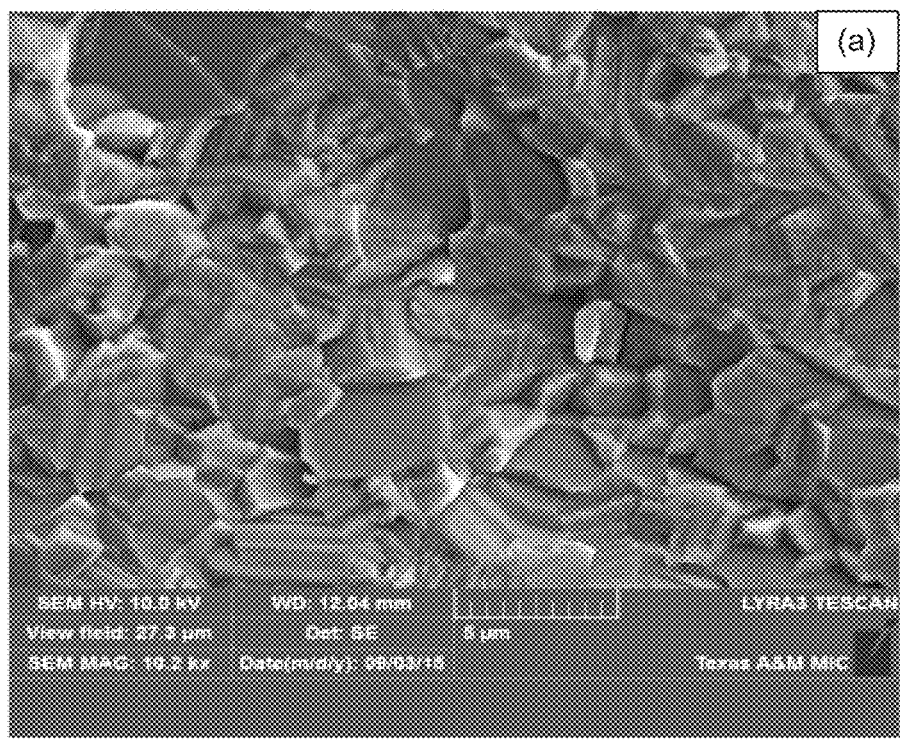
FIG. 5 is an SEM image of a sintered product made in accordance with the teachings herein.

FIG. 5 shows SEM images of the sintered product. The SEM images indicate high density samples without any pores or voids in the samples. The knoop hardness for the nano-grained samples were measured and found to be in the range of 290-320 kg/mm$^2$. It also shows the grain size is approximately in the range of 1 to 5 µm.

The sample obtained through SPS process is further Hot-Isostatically pressed (HIP). The HIP process subjects a component to both elevated temperature and isostatic gas pressure in a high pressure containment vessel. The pressurizing gas most widely used is Argon. An inert gas is used, so that the material does not chemically react. The chamber is heated, causing the pressure inside the vessel to increase. Many systems use associated gas pumping to achieve the necessary pressure level. Pressure is applied to the material from all directions (hence the term "isostatic"). The HIP is performed at a temperature within the range of 800-1100° C., and more preferably, at a temperature within the range of 850-1080° C. wrapped in Molybdenum, copper and platinum foils to achieve visually transparent samples also called as water clear and multi-spectral grade ZnS. This sample is transparent in the visible range, mid IR range and long wavelength region. The samples were cut and polished using several grade diamond pastes.

Figure 6:
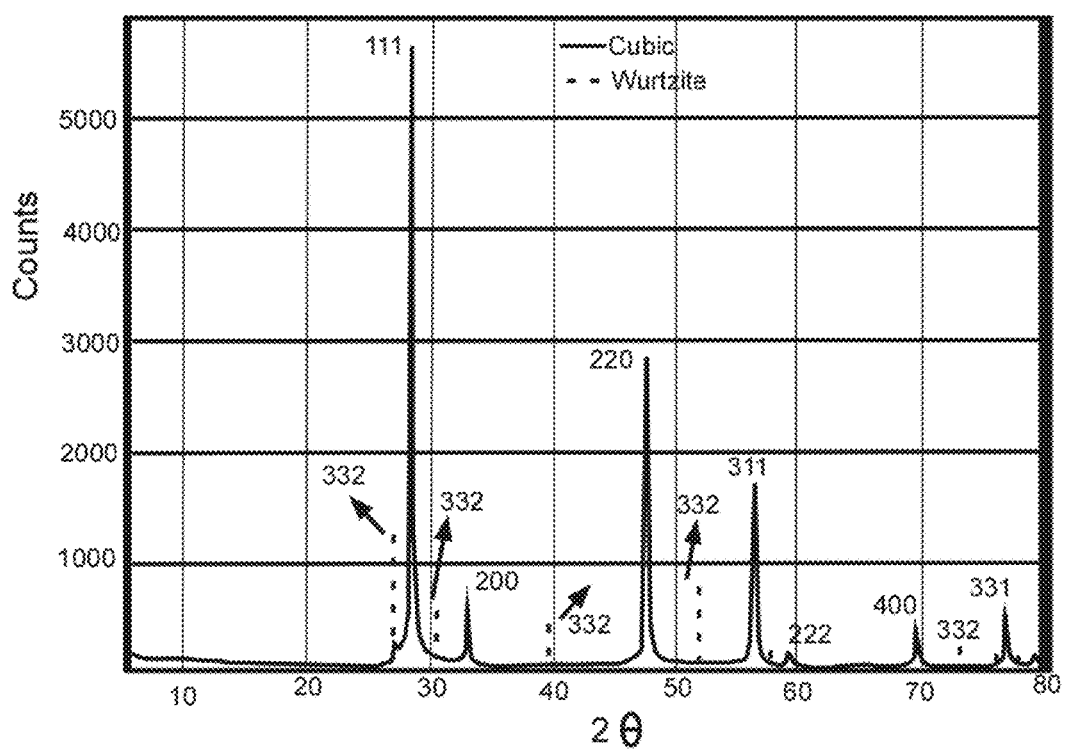
FIG. 6. ZnS sintered disk via SPS method show X-ray diffraction of a zinc sulphide sample made in accordance with a methodology disclosed herein.

The FIG. 6 shows the X-ray diffraction analysis of ZnS disk that went through the SPS process. It can be seen that there is a trace level appearance of Wurtzite phase with a minimal peak. All the cubic phases of ZnS as seen in FIG. 2 are retained. The wurtzite phases 332 starts to appear. Wurtzite phase will decrease the transmission of the sample if the peak intensity is substantial. Since the peak intensity is small compared to the cubic phase (example 322 next to 111) the IR transmission is still high (around 75%).

The sintered and annealed ceramic windows disclosed herein may be supplemented with coatings to further enhance their properties and to provide increased protection. An anti-reflective coating, for example, may be applied to minimize the reflection of infrared radiation and thereby cause more of the radiation to pass through the window. Examples of coating materials for this purpose are low refractive index materials, particularly yttria, silica, magnesium fluoride, calcium fluoride, zinc fluoride, zinc selenide, and Hafnium oxide. Multiple antireflective coatings may also be used. In some applications, a coating that will transmit visible radiation in addition to the infrared radiation may be desired. Examples of coating materials for this purpose are leaded glass and Zinc Selenide. Alternatively or in addition, coatings for scratch or erosion resistance may be applied, particularly for enhanced protection against rain, blowing sand, and particle impacts in general. Materials with a high damage threshold velocity, such as gallium phosphide, sapphire, spinel, and aluminum oxynitride (ALON) may also be utilized.

The above description of the present invention is illustrative, and is not intended to be limiting. It will thus be appreciated that various additions, substitutions and modifications may be made to the above described embodiments without departing from the scope of the present invention. For example, (i) the mold material can be made of alloy materials of Tungsten-Zirconium-Molybdenum (ii) during SPS process, DC pulse shapes could be designed to inject modulated current (iii) SPS process can replaced by Laser sintering process or RF sintering process or Microwave sintering process or hot-press process or cold iso-static process followed by sintering or vacuum sintering (iv) although the current invention focuses on ZnS, the process can be equally applied to CdS and ZnSe or any falling in the family of Chalcogenides. Accordingly, the scope of the present invention should be construed in reference to the appended claims.

Thus we claim:

1. A process for producing an article which is transparent to infrared in the wavelength range of 3 μm to 12 μm, the process comprising the steps of:
   synthesizing ultrafine powders utilizing oxidizer including metal acetates, metal nitrates with glycine, thiourea, and thioacetamide as fuels, through self-propagating low temperature synthesis and generation of population of ZnS nanoparticles;
   pre-treating said ZnS nanoparticles with $H_2S$, $H_2$, $N_2$, Ar gases or mixtures of gases thereof;
   vacuum treating said ZnS nanoparticles to remove moisture, oxygen and sulfates;
   filling said ZnS nanoparticles inside a die-set cavity and applying pressure on said ZnS nanoparticles;
   subjecting said ZnS nanoparticles to pulsed spark plasma treatment, and sintering said ZnS nanoparticles to form ZnS disk;
   subjecting said ZnS disk to hot-isostatic press and obtaining a final product that is transparent to visible, mid IR and longwave infrared wavelength region, wherein said ZnS disk having an infrared transmission is greater than or equal to 65%to 75% in the wavelength between 3 μm to 12 μm at the thickness of 4 mm.

2. The process according to claim 1, wherein the pre-treating of said ZnS nanoparticles is preformed in a mixture of $H_2S$ and $H_2$ with volume ratio 1:4:9, at a temperature in the range of 450° C. to 700° C. and duration in the range of 2 to 4 hours.

3. The process according to claim 1, wherein the pre-treating of said ZnS nanoparticles is preformed in a mixture of $H_2S$ and $N_2$ with volume ratio 1:4:9, at a temperature in the range of 450° C. to 700° C. and duration in the range of 2 to 4 hours.

4. The process according to claim 1, wherein the pre-treating of said ZnS nanoparticles is preformed in a mixture of $H_2S$ and Ar with volume ratio 1:4:9, at a temperature in the range of 450° C. to 700° C. and duration in the range of 2 to 4 hours.

5. The process according to claim 1, wherein said vacuum treating of ZnS nanoparticles is preformed in the range of temperatures less than 600° C. and in the range of vacuum of $1\times10^{-3}$ Torr to $3\times10^{-6}$ Torr for a time duration of 3 to 6 hours.

6. The process according to claim 1, wherein said pulsed spark plasma can be replaced by laser sintering or microwave sintering or vacuum sintering or cold-isostatic pressing or any combinations thereof.

7. The process according to claim 1, wherein said die-set is passivated with protective coating to prevent contamination entering the final product.

8. The process according to claim 1, wherein said ZnS disk having an infrared transmission in the range of 70%to 75% in the wavelength range of 4 μm to 9 μm at the thickness of 4 mm.

9. The process according to claim 1, wherein a nano-grained ZnS have a knoop hardness in the range of 290-320 kg/mm².

10. A process for producing an article which is transparent to infrared in the wavelength range of 3 μm to 12 μm, the process comprising the steps of:
    synthesizing ultrafine powders utilizing oxidizer including metal acetates and metal nitrates with thiourea, $SeS_2$ or glycine as fuels, through self-propagating low temperature synthesis and generation of population of ZnSe nanoparticles;
    pre-treating said ZnSe nanoparticles with $H_2S$, $H_2$, $N_2$, Ar gases or mixtures of gases thereof;
    vacuum treating said ZnSe nanoparticles to remove sulfates, oxygen and moisture;
    filling said ZnSe nanoparticles inside a die-set cavity and applying pressure on said ZnSe nanoparticles;
    subjecting said ZnSe nanoparticles to pulsed spark plasma treatment, and sintering said ZnSe nanoparticles to form ZnSe disk;
    subjecting said ZnSe disk to hot isostatic press and obtaining a final product that is transparent to an infrared wavelength.

11. A process for producing an article which is transparent to infrared in the wavelength range of 3 μm to 12 μm, the process comprising the steps of: synthesizing ultrafine powders utilizing oxidizer including metal acetates, metal nitrates with thiourea or glycine through as fuels, self-propagating low temperature synthesis and generation of population of CdS nanoparticle;
    pre-treating said CdS nanoparticles with $H_2S$, $H_2$, $N_2$, Ar gases or mixtures of gases thereof;
    vacuum treating said CdS nanoparticlest o remove moisture, sulfates and oxygen;
    filling said CdS nanoparticles inside a die-set cavity and applying pressure on said CdS nanoparticles;
    subjecting said CdS nanoparticles to pulsed spark plasma treatment, and sintering said CdS nanoparticles to form CdS disk;
    subjecting said CdS disk to hot isostatic press and thus obtaining a final product that is transparent to an infrared wavelength.

* * * * *